United States Patent
Ai et al.

(10) Patent No.: US 7,819,586 B2
(45) Date of Patent: Oct. 26, 2010

(54) FAN WITH AN ANTI-LEAKAGE DEVICE FOR AN OILY BEARING

(75) Inventors: Chi Ai, Kaohsiung (TW); Hung-Guang Li, Kaohsiung (TW)

(73) Assignee: Asia Vital Components Co. Ltd., Kaohsiung (TW)

( * ) Notice: Subject to any disclaimer, the term of this patent is extended or adjusted under 35 U.S.C. 154(b) by 624 days.

(21) Appl. No.: 11/781,956

(22) Filed: Jul. 24, 2007

(65) Prior Publication Data
US 2009/0028475 A1 Jan. 29, 2009

(51) Int. Cl.
*F16C 32/06* (2006.01)

(52) U.S. Cl. .................. 384/107; 384/279; 384/100

(58) Field of Classification Search ............ 384/279, 384/902, 100, 107, 114; 417/354, 423.12, 417/423.13
See application file for complete search history.

(56) References Cited

U.S. PATENT DOCUMENTS

| | | | | |
|---|---|---|---|---|
| 4,726,693 A | * | 2/1988 | Anderson et al. | 384/114 |
| 5,932,946 A | * | 8/1999 | Miyasaka et al. | 384/279 |
| 6,626,577 B1 | * | 9/2003 | Horng et al. | 384/292 |
| 6,756,714 B2 | * | 6/2004 | Alex et al. | 384/279 |
| 2002/0172609 A1 | * | 11/2002 | Hsieh | 417/423.7 |
| 2003/0075703 A1 | * | 4/2003 | Kobayashi et al. | 384/279 |
| 2006/0171826 A1 | * | 8/2006 | Wu et al. | 417/423.13 |
| 2007/0041672 A1 | * | 2/2007 | Maruyama et al. | 384/279 |
| 2009/0022611 A1 | * | 1/2009 | Bei et al. | 417/423.12 |

\* cited by examiner

*Primary Examiner*—Thomas R Hannon

(57) ABSTRACT

A fan with an anti-leakage device for an oily bearing includes a base, an axial barrel, a fan wheel and a bearing. The axial barrel extends from the base and provides a first end, a second end, a first oil storage groove at the second end. The fan wheel extends a spindle from the inner side thereof and provides a joining part surrounding an end of the spindle and being adjacent to the inner side of the first end. The bearing is received in the axial barrel and further includes an axial through bore, which provides two inverted cone shaped ends, and at least a second oil storage groove, which is provided at a wall surface of the axial through bore for being adjacent to the spindle closely. Thus, a closed circuit is formed for the lubrication oil flowing back to the bearing without leakage.

5 Claims, 6 Drawing Sheets

FAN WITH AN ANTI-LEAKAGE DEVICE FOR AN OILY BEARING

BACKGROUND OF THE INVENTION

1. Field of the Invention

The present invention is related to a fan with an anti-leakage device for an oily bearing and particularly to an anti-leakage device capable of avoiding waste of lubrication oil and lasting life span of the fan.

2. Brief Description of the Related Art

The conventional fan as shown in FIG. 1 has a main body 10 with a locating seat 11 at the center of the main body 10. An axial barrel 111 extends upward the locating seat 11 and receives a bearing 12. A coil 13 is provided to surround the axial barrel 111. A fan wheel 14 provides a plurality of blades 141 extending outward radially and a magnetic ring 142 surrounding the inner side thereof to correspond to coil 13. A spindle 143 extends from the inner side of the fan wheel 14 and is inserted into the bearing 12 and held by a retaining ring 15 and an oil ring 16.

The preceding conventional fan has problems while in use. The bearing 12 is capable of releasing lubrication oil via the sintered hole to lubricate the spindle 143 during high speed rotation in order to avoid dry friction. However, the oil ring 16 is incapable of stopping the lubrication oil leaking from clearances of the outer end of the axial barrel 111 and the lubrication oil keeps moving out via the clearance between the barrel 111 and the spindle 143. As a result, due to depletion of lubrication oil, it results in dry friction between the spindle 143 and the bearing 12 and excessive wear of the spindle 143 and the bearing 12 such that noise is created and life span of the fan is shortened.

SUMMARY OF THE INVENTION

In order to overcome the preceding deficiencies of the conventional fan, an object of the present invention is to provide a fan with an anti-leakage device in which a second oil storage groove is provided at the wall surface of the axial through bore of the bearing such that the lubrication oil between the bearing and the spindle is incapable of being influenced by capillary action and centrifugal force to move outward along the outer surface of the spindle.

Another object of the present invention is to provide a fan with an anti-leakage device in which two inverted cone shaped ends are provided at two ends of the axial through bore of the bearing and a line contact between the bearing and the spindle is constituted to avoid point wear.

A further object of the present invention is to provide a fan with an anti-leakage device in which the bearing provides a joining part at the inner side of the fan wheel such that lubrication oil, which is blocked by the joining part, to allow the lubrication oil returning to the bearing without leakage.

In order to achieve the preceding objects, a fan with an anti-leakage device according to the present invention includes a base, an axial barrel, a fan wheel and a bearing. The axial barrel extends from the base and provides a first end, a second end and a first oil storage groove disposed at the second end. A spindle extends from the inner side of the fan wheel and a joining part is provided to surround an end of the spindle and to be adjacent to the inner side of the first end of the axial barrel. The bearing is received in the axial barrel and further includes an axial through bore, which provides two inverted cone shaped ends, and at least a second oil storage groove, which is provided at a wall surface of the axial through bore and is adjacent to the spindle closely. Therefore, a closed circuit is formed for the lubrication oil being able to flow back to the bearing without leakage.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
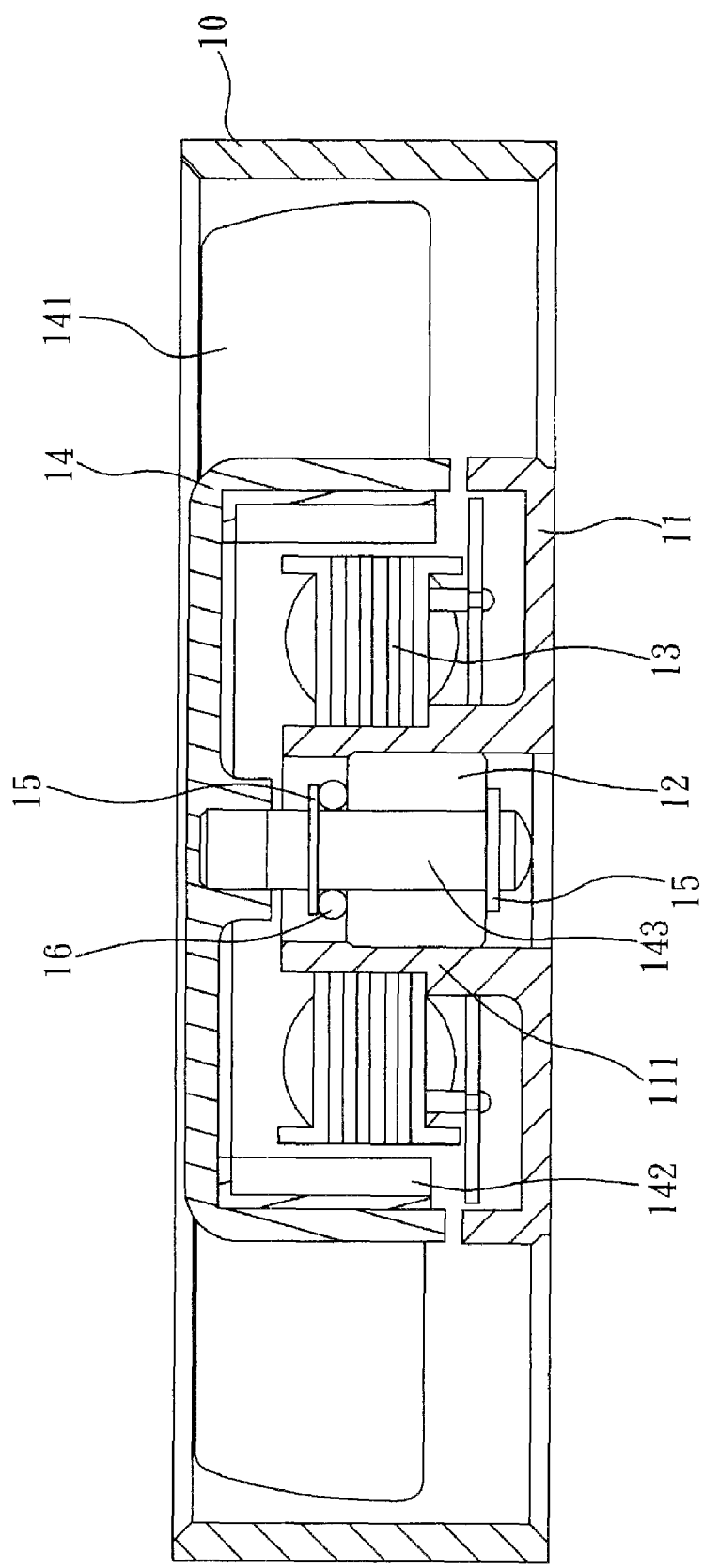
FIG. 1 is a sectional view of the conventional fan.
Figure 2:
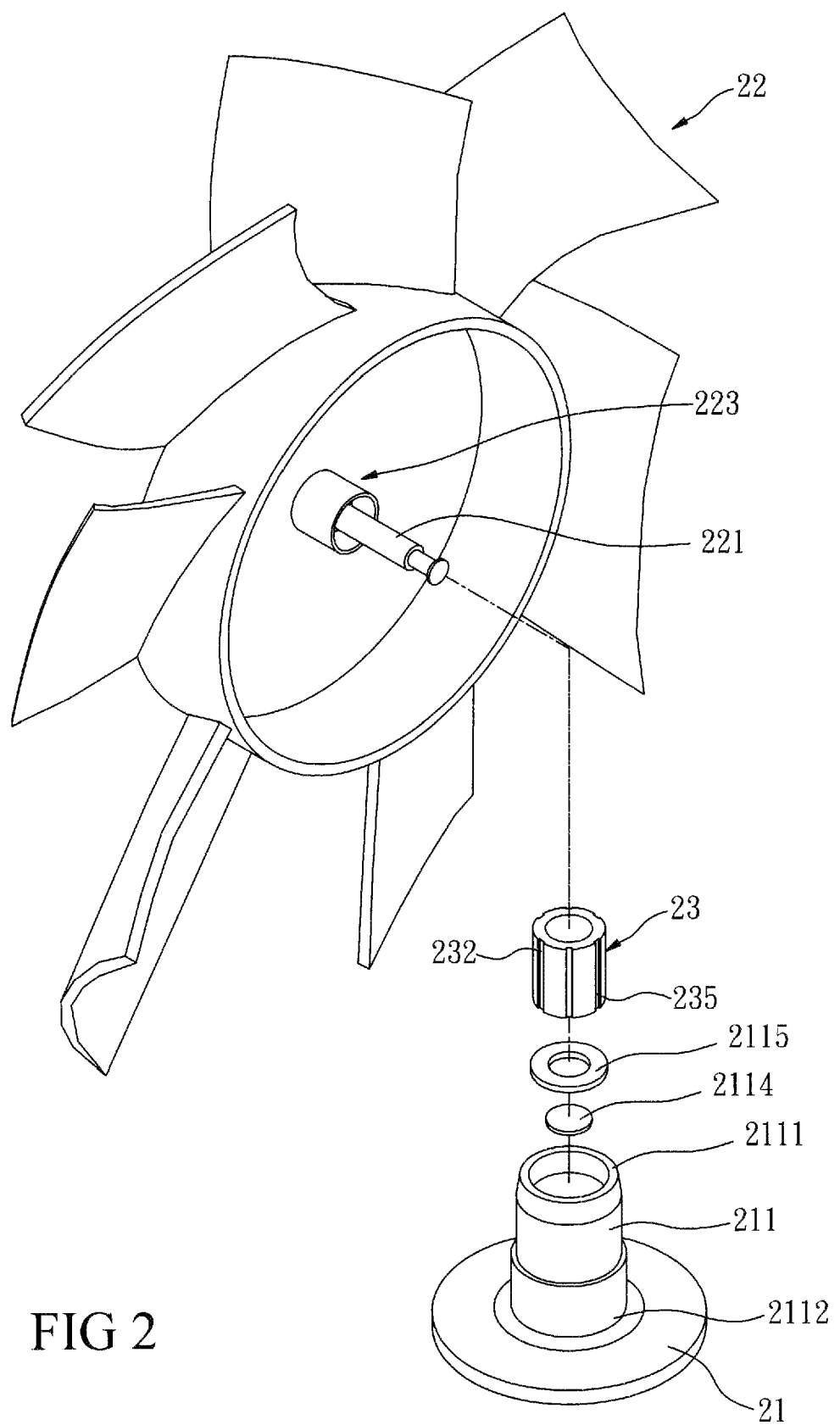
FIG. 2 is a perspective view of a preferred embodiment of a fan with an anti-leakage device for an oily bearing according to the present invention.
Figure 3:
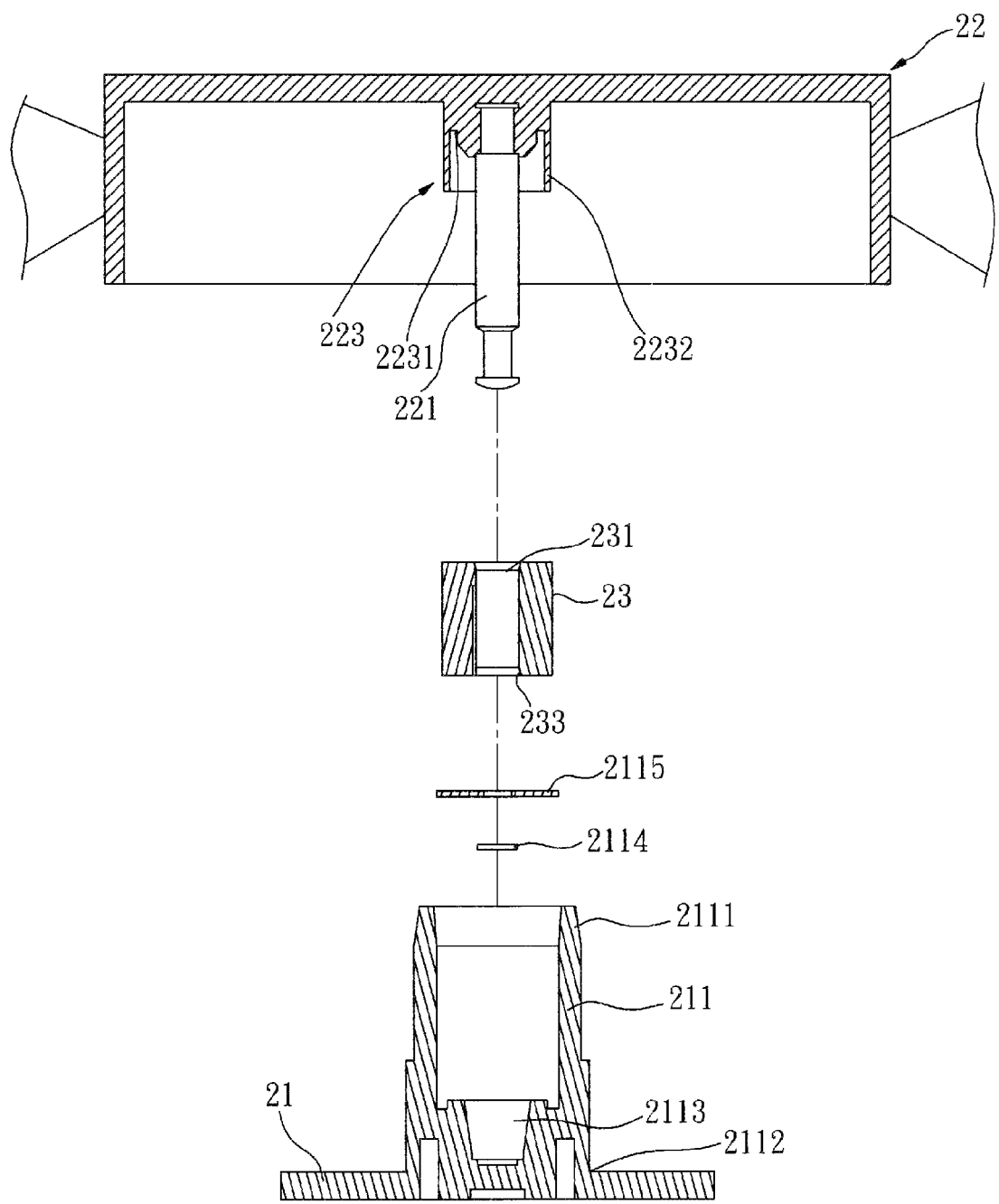
FIG. 3 is an exploded sectional view of the preferred embodiment of a fan with an anti-leakage device for an oily bearing according to the present invention.
Figure 4:
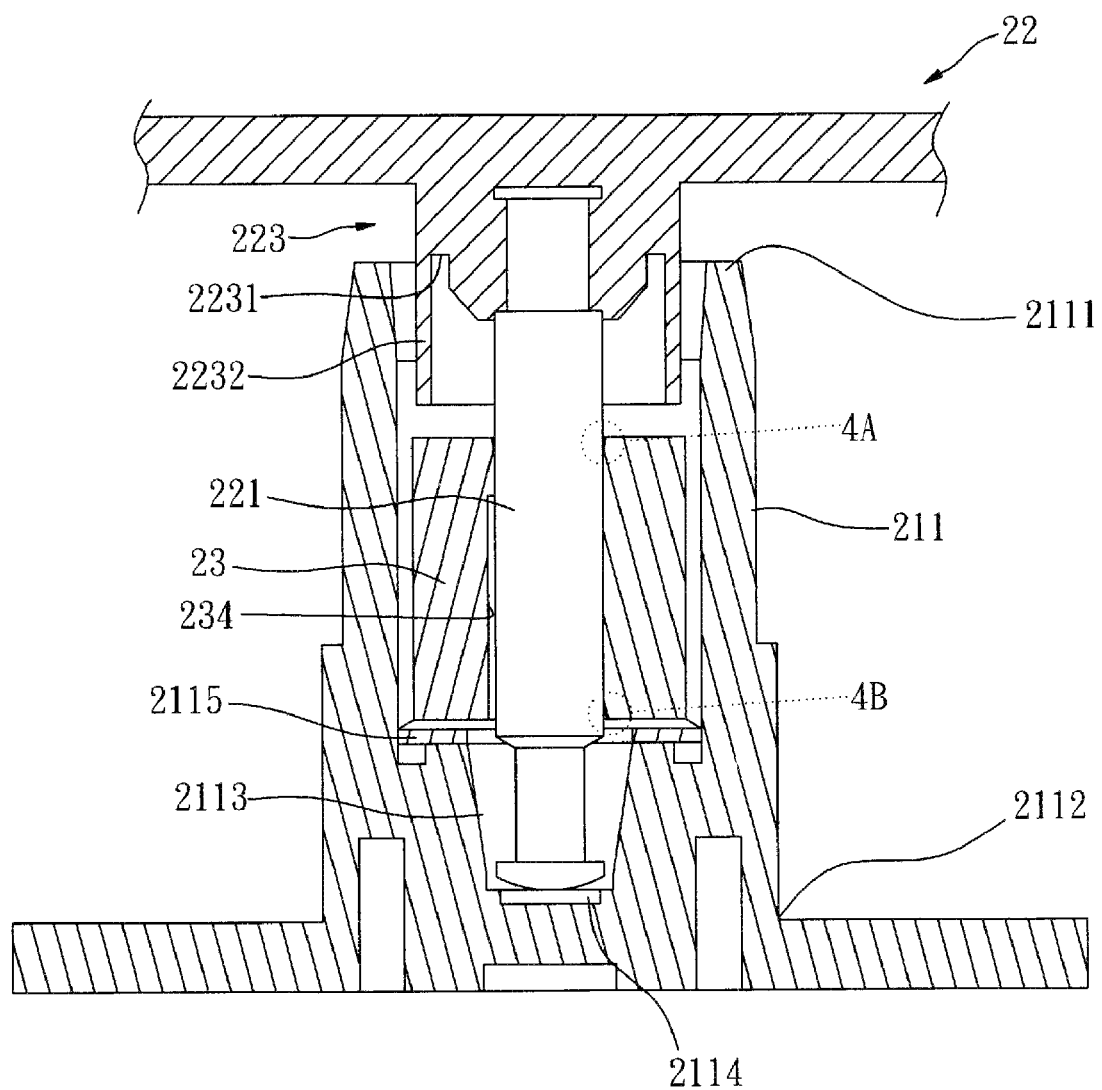
FIG. 4 is an assembled sectional view of the preferred embodiment of a fan with an anti-leakage device for an oily bearing according to the present invention.
Figure 4A:
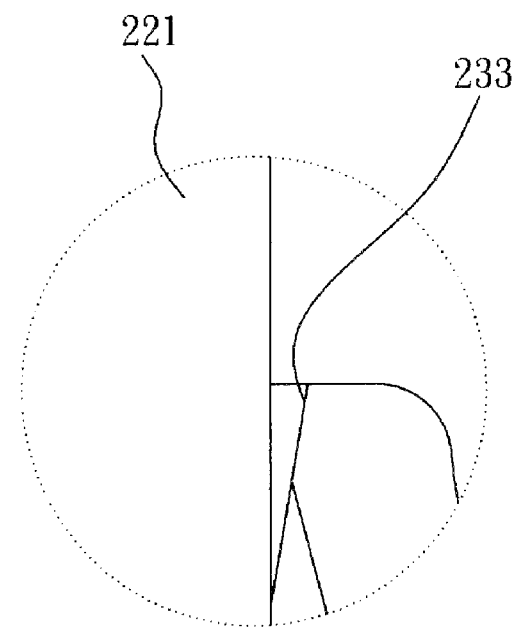
FIG. 4A is an enlarged view of the portion enclosed by the dash circle 4A shown in FIG. 4.
Figure 4B:
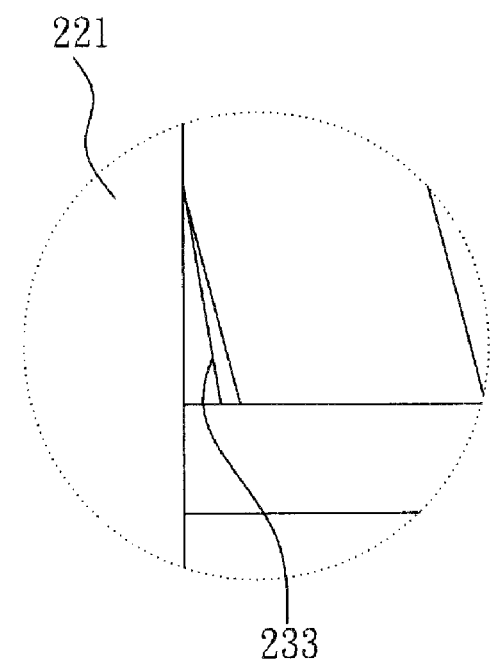
FIG. 4B is an enlarged view of the portion enclosed by the dash circle 4A shown in FIG. 4.

Referring to FIGS. 2 to 4, 4A, 4B and 5 to 6, a fan with an anti-leakage device for an oily bearing according to the present invention includes a base 21, a fan wheel 22 and a bearing 23. The base 21, which can be disposed in a fan frame or attached to a heat sink, provides an axial barrel 211 for receiving the bearing 23. The fan wheel 22 has a spindle 221 fitting with the bearing 23 such that the fan wheel 22 is capable of rotating on the base 21.

The axial barrel 211 has a first end 2111 and a second end 2112. A first oil storage groove 2113 is disposed at the inner side of the second end 2112. A wearable piece 2114 is disposed at the bottom of the first oil storage groove 2113 and a retaining ring 2115 is disposed at the top of the first oil storage groove 2113. The second end 2112 shown in the figures is a closed end but it can be arranged as an open end or an open end with a lower cover (not shown) instead.

The spindle 221 extends outward from the center of the inner side of the fan wheel 22. A joining member 223 is formed at the center of the inner side enclosing the root of the spindle 221 to correspond to the first end 2111 of the axial barrel 211. The joining member 223 further includes an inner annular recess 2231, which surrounds the root of the spindle 221, and an outer cylinder 2232, which surrounds the inner annular recess 2231 and passes the inner side of first end of the axial barrel 211 to extend into the axial barrel 211. The outer cylinder 2232 is adjacent to the inner side of the first end 2111.

The bearing 23, which is received in the axial barrel 211 and disposed between the first oil storage groove 2113 and the outer cylinder 2232, has an axial through bore 231. The axial through bore 231 has two inverted cone-shaped ends 233 and at least a second oil storage groove 234 at the wall surface thereof.

Figure 5:
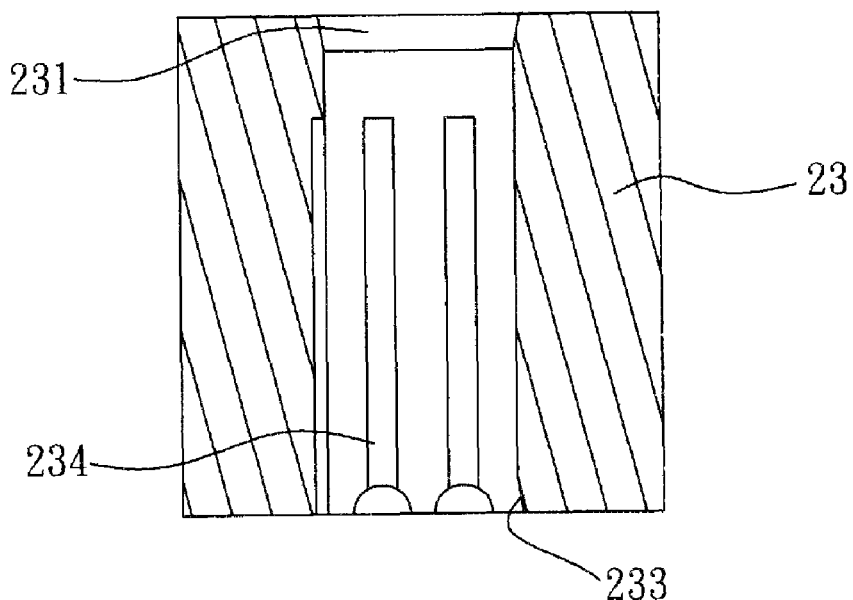
FIG. 5 is a cross section of the second oil storage groove illustrated in the preferred embodiment.
Figure 6:
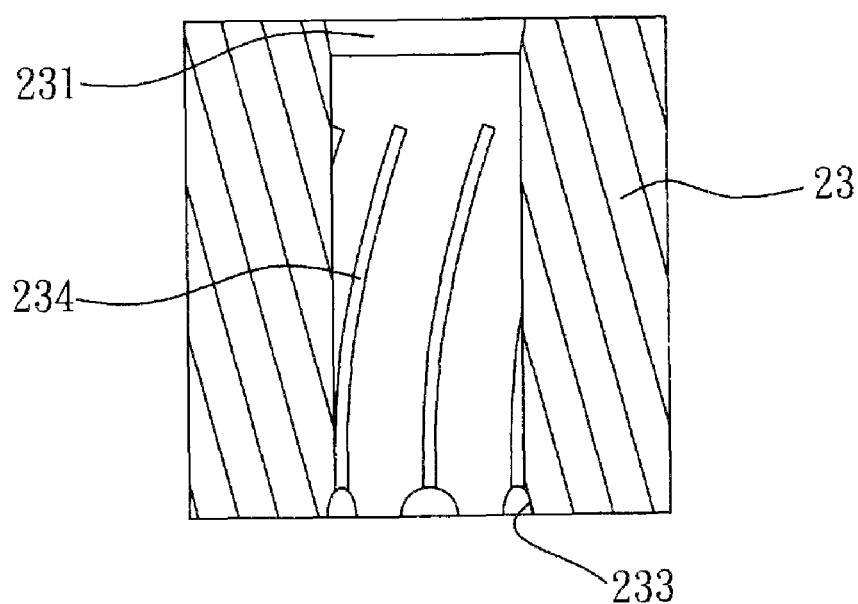
FIG. 6 is a cross section of the second oil storage groove similar to FIG. 5 illustrating another state thereof.

The outer surface of the bearing 23 provides at least an elongated furrow 235 extending downward to the other end thereof from an end thereof. The second oil storage groove 234 is elongated and axially extends from the middle section of the wall surface of the axial through bore 231 to the bottom end of the axial through bore 231 as shown in FIG. 5. Alternatively, the second oil storage groove 234 extends from the middle section of the wall surface of the axial through bore 231 helically down to the bottom end of the axial through bore 231 as shown in FIG. 6.

The spindle 221 is inserted into the axial bore 231 with the free end thereof plunging into the first oil storage groove 2113 and the retaining ring 2115 at the top of the first oil storage groove 2113 holds the spindle 221. Meanwhile, the free end of the spindle 221 contacts with wearable piece 2114 and the outer surface of the spindle 221 is adjacent to the second oil storage groove 234.

Thus, when the spindle 221 rotates with respect to the bearing 23, the lubrication oil in the first oil storage groove 2113 moves outward along the spindle 221 to allow most of the lubrication oil staying in the second oil storage groove 234 to prevent a phenomenon of dry friction between the spindle 221 and the wall surface of the axial through bore 231. Meanwhile, only a small amount of the lubrication oil keeps moving along the circumferential surface of the spindle 221 to the cone-shaped ends 233. The lubrication oil moves outward the upper cone-shaped end 233 flows back to the first oil storage groove 2113 along the elongated furrow 235 at the outer surface of the bearing 23 because of being stopped by the outer cylinder 2232 and the annular recess 2231 and the lubrication oil moves outward the lower cone-shaped end 233 flows back to the first oil storage groove 2113 directly. Therefore, the anti-leakage device recited above provides double protections for the lubricant from leaking outward.

Additionally, the lubrication oil received by the cone shaped end 233 becomes a protection zone of lubrication oil between the cone shaped end 233 and the outer surface of the spindle 221 to prevent phenomenon of point wear to the bearing 23 resulting from deviation of the spindle 221.

While the invention has been described with referencing to a preferred embodiment thereof, it is to be understood that modifications or variations may be easily made without departing from the spirit of this invention, which is defined by the appended claims.

What is claimed is:

1. A fan with an anti-leakage device comprising:
   a base;
   an axial barrel extending from the base, providing a first end and a second end and providing a first oil storage groove at the second end for containing a lubricant;
   a fan wheel providing a joining member, wherein the joining member has an inner annular recess surrounding the center of the fan wheel, and an outer cylinder surrounds the inner annular recess and extends into the axial barrel via the inner side of the first end;
   a spindle extending from the center of the fan wheel to the bottom of the first oil storage groove;
   a bearing with an axial through bore being received in the axial barrel and disposed between the outer cylinder and the first oil storage groove, the axial through bore being passed by and fitting with the spindle, the axial through bore having two opposite cone-shaped ends and at least a second oil storage groove at a wall surface thereof, wherein one of the cone-shaped ends is disposed next to the first oil storage groove and the other one of the cone-shaped ends is disposed next to the outer cylinder, and the second oil storage groove extends from the cone-shaped end next to the first oil storage groove for receiving the lubricant from the first oil storage groove;
   whereby, when the spindle rotates with respect to the bearing, the lubricant moves outward from the first oil storage groove along the spindle, most of the lubricant stays in the second oil storage groove to prevent a phenomenon of dry friction between the spindle and the wall surface of the axial bore; only a small amount of the lubricant moves outward the cone-shaped ends, the lubricant moving outward the cone-shaped end next to the outer cylinder is stopped by the outer cylinder and the annular recess and flows back to the first oil storage groove along the outer surface of the bearing, and the lubricant moving outward the cone-shaped end next to the first oil storage groove flows back to the first oil storage groove directly.

2. The fan with an anti-leakage device as defined in claim 1, wherein the outer surface of said bearing provides at least an elongated furrow extending from an end to another end of the bearing.

3. The fan with an anti-leakage device as defined in claim 1, wherein said second oil storage groove extends from the middle section of the wall surface of the axial through bore to an end thereof next to the first oil storage groove.

4. The fan with an anti-leakage device for an oily bearing as defined in claim 1, wherein said second oil storage groove extends axially.

5. The fan with an anti-leakage device for an oily bearing as defined in claim 1, wherein said second oil storage groove extends helically.

* * * * *